(12) United States Patent
O'Keefe (10) Patent No.: US 9,254,772 B2
(45) Date of Patent: Feb. 9, 2016

(54) SYSTEM AND METHOD OF LOADING AND UNLOADING CONTAINERS

(76) Inventor: Robert Trevor O'Keefe, Mount Helena (AU)

( * ) Notice: Subject to any disclaimer, the term of this patent is extended or adjusted under 35 U.S.C. 154(b) by 71 days.

(21) Appl. No.: 14/006,558

(22) PCT Filed: Mar. 19, 2012

(86) PCT No.: PCT/AU2012/000287
§ 371 (c)(1),
(2), (4) Date: Sep. 20, 2013

(87) PCT Pub. No.: WO2012/126050
PCT Pub. Date: Sep. 27, 2012

(65) Prior Publication Data
US 2014/0010621 A1    Jan. 9, 2014

Related U.S. Application Data

(60) Provisional application No. 61/498,858, filed on Jun. 20, 2011, provisional application No. 61/565,667, filed on Dec. 1, 2011.

(30) Foreign Application Priority Data

Mar. 23, 2011  (AU) ............................... 2011901079
Oct. 14, 2011  (AU) ............................... 2011904186

(51) Int. Cl.
*B60P 1/30*    (2006.01)
*B60P 1/64*    (2006.01)

(52) U.S. Cl.
CPC *B60P 1/30* (2013.01); *B60P 1/6454* (2013.01)

(58) Field of Classification Search
CPC ......... B60P 1/6454; B60P 1/6427; B60P 1/30

USPC .................................................. 414/491, 492
See application file for complete search history.

(56) References Cited

U.S. PATENT DOCUMENTS 3,077,278 A * 2/1963 Alexander .................... 414/494
3,272,546 A    9/1966 Cooley
(Continued)

FOREIGN PATENT DOCUMENTS

AU    2006200964    8/2007
AU    2008207602    9/2008
(Continued)

OTHER PUBLICATIONS

English translation of a Chinese Office Action issued Chinese Patent Application No. 201280025019.0, May 5, 2015, 11 pages.
(Continued)

*Primary Examiner* — Kaitlin Joerger
(74) *Attorney, Agent, or Firm* — Hamre, Schumann, Mueller & Larson, P.C.

(57) ABSTRACT

A system and method of loading and unloading a shipping container onto and off a tilt-tray vehicle is described. The system includes a drawbar assembly adapted to be releasably attached to opposite corner connectors provided on the container. A winch is provided for applying fraction to the drawbar assembly to draw the container onto the vehicle tray and to facilitate loading of the container onto the tray. An ejector assembly is also provided to releasably engage the drawbar assembly connected to the container. When it is desired to unload the container, the ejector assembly is moved towards the rear of the tray to move the container partially off the vehicle.

6 Claims, 10 Drawing Sheets

(56) References Cited

U.S. PATENT DOCUMENTS

| | | | |
|---|---|---|---|
| 3,467,268 A * | 9/1969 | Corompt | 414/494 |
| 3,841,505 A * | 10/1974 | Kent | 414/787 |
| 3,848,758 A | 11/1974 | Carter | |
| 3,892,323 A * | 7/1975 | Corompt | 414/491 |
| 3,899,205 A * | 8/1975 | Lanigan et al. | 294/67.31 |
| 4,133,439 A | 1/1979 | Goranson | |
| 4,352,625 A * | 10/1982 | Bolderoff | 414/494 |
| 4,384,816 A * | 5/1983 | Martin et al. | 414/492 |
| 4,704,062 A | 11/1987 | Hale | |
| 4,737,063 A * | 4/1988 | van den Pol | 414/346 |
| 4,802,811 A * | 2/1989 | Nijenhuis | 414/478 |
| 5,007,791 A * | 4/1991 | Boughton | 414/494 |
| 5,082,416 A * | 1/1992 | Bock | 414/492 |
| 5,203,668 A | 4/1993 | Marmur | 414/500 |
| 6,332,746 B1 * | 12/2001 | Lang et al. | 414/494 |
| 6,568,892 B2 * | 5/2003 | Landoll et al. | 410/80 |
| 6,761,524 B2 * | 7/2004 | Chabanas et al. | 414/491 |
| 7,192,239 B2 * | 3/2007 | Marmur et al. | 414/478 |
| 7,563,065 B1 | 7/2009 | Bennett | |
| 8,029,228 B2 * | 10/2011 | Marmur | 414/478 |
| 8,465,246 B2 * | 6/2013 | Duell et al. | 414/494 |
| 8,870,517 B2 * | 10/2014 | Jones | 414/491 |
| 2006/0070757 A1 | 4/2006 | Posselius et al. | |
| 2007/0237617 A1 * | 10/2007 | Schroeder | 414/491 |
| 2010/0303595 A1 * | 12/2010 | Duell et al. | 414/491 |

FOREIGN PATENT DOCUMENTS

| | | |
|---|---|---|
| CN | 201457503 | 5/2010 |
| DE | 16 80 201 | 8/1970 |
| DE | 34 37 854 | 4/1986 |
| GB | 1 374 222 | 11/1974 |

OTHER PUBLICATIONS

Extended European Search Report issued in corresponding European Application No. 12761509.4, Nov. 15, 2015, 7 pages.

\* cited by examiner

SYSTEM AND METHOD OF LOADING AND UNLOADING CONTAINERS

FIELD OF THE INVENTION

The present invention relates to a system and method of loading and unloading shipping containers onto and off a tilt-tray truck and relates particularly, though not exclusively, to an ejector assembly for assisting in unloading such a container from a tilt-tray truck.

BACKGROUND TO THE INVENTION

Cargo or sea containers are commonly used for transporting goods either on land by rail or road transport, or at sea on container ships. Such shipping containers are generally of a rectangular parallelepiped configuration so as to enable the containers to be stacked one on top of the other or to enable the containers to be supported on a deck of a ship or on a tray of a transport vehicle such as a railcar or road vehicle. Shipping containers are usually provided with doors on at least one end to provide access to the interior of the container. Corner fittings or sockets are provided at each external corner of the container for engagement by connecting devices to secure the container to the deck of a ship or tray of a vehicle or to secure containers together. The corner fittings include elongate apertures on the lower side of the container for receipt of rotatable cleats or lugs of the connecting devices which are receivable within the apertures and which are rotatable to lock the containers in position. Apertures are also provided in the corner fittings on the top, side and end faces of the container so that containers stacked upon each other can be locked together or adjacent containers locked together by similar connecting devices in an end-to-end or side-by-side configuration.

A particular difficulty occurs when a shipping container which is on the ground is to be loaded onto a road vehicle having a flat bed or tray, but no crane or hoist to lift the container onto the tray. With this type of vehicle the bed or tray (which is often slidably mounted on the vehicle chassis) is tilted to an inclined position and moved into longitudinal alignment with and adjacent to an end of the container. A winch cable, attached to a winch provided centrally at a front end of the tilt-tray, is coupled to the container. When the winch is operated, the intention is for the container to be drawn onto the tray. However it is not uncommon for the end of the container to abut the rear end of the tray and to become jammed against the rear end of the tray, thereby preventing the container from being winched onto the tray of the vehicle. The result is that a substantial load is then placed on the winch producing high tension in the cable, with the potential for catastrophic failure of either the winch or the cable. If the cable should break it may result in severe injury and even death for any person in the vicinity who may be struck by the cable.

To help avoid this situation and to make it easier to load a container onto a vehicle flat-bed tilt-tray, commonly-owned Australian Patent No 2006900175 describes a method and apparatus for loading containers which involves the use of a specially designed elongated drawbar assembly. The method and apparatus of AU2006900175 has been very successful in overcoming the problems associated with loading a container onto a flat-bed tray. However there are also problems associated with the reverse process of unloading a container from a flat-bed tray. For example, when the container is ready to be unloaded, the gravitational forces acting on the container by tilting the tray may not be sufficient to overcome the frictional forces between the bottom of the container and the tray. There is a risk that the container may slide backwards off the tray in an uncontrolled manner.

The present invention was developed with a view to providing a system and method of both loading and unloading a shipping container more safely from a flat-bed tray. The invention also relates to an ejector assembly for assisting in unloading a shipping container from a vehicle tray, and relates more particularly to a vehicle with a tilt-tray which is fitted with such an ejector assembly.

References to prior art in this specification are provided for illustrative purposes only and are not to be taken as an admission that such prior art is part of the common general knowledge in Australia or elsewhere.

SUMMARY OF THE INVENTION

According to one aspect of the present invention there is provided a method of loading and unloading a shipping container onto and off a tilt-tray vehicle, the method comprising the steps of:

releasably attaching a drawbar assembly to opposite corner connectors provided on the container such that the drawbar assembly extends transversely of the container adjacent a lower edge of the container and forwardly of the container;

inclining the vehicle tray and positioning a rear edge of the tray adjacent the drawbar assembly on the lower edge of the container;

applying traction to the drawbar assembly to draw the container onto the vehicle tray and to facilitate loading of the container onto the tray wherein, in use, the drawbar assembly cooperates with the inclined tray to lift the lower edge of the container onto the tray;

when it is desired to unload the container releasably engaging the drawbar assembly attached to the container on the tray with an ejector assembly; and, moving the ejector assembly towards the rear of the tray to move the container partially off the vehicle to facilitate unloading of the container off the vehicle tray.

Preferably when it is desired to unload the container the method further comprises the steps of inclining the vehicle tray and moving the tray until a rear edge of the container rests on the ground at a designated drop-off point.

Typically when the elector assembly has moved to its fully extended position the container, attached to the drawbar assembly, hangs about 600 mm over the rear of the tray. Preferably when it is desired to unload the container the method further comprises the steps of releasing the drawbar assembly from the container and, with the ejector assembly, returning it to a rest position. Preferably at the same time as, or subsequent to, the step of returning the drawbar assembly to the rest position, the vehicle is slowly driven forward so that the remainder of the container slides off the tray and comes to rest on the designated drop-off point. Preferably when the drawbar assembly has returned to its rest position, the ejector head is disengaged from the drawbar assembly and returned to its lowered position beneath the upper surface of the tilt-tray, and the drawbar assembly is secured in a locked position on the tray.

According to another aspect of the present invention there is provided a system of loading and unloading a shipping container onto and off a tilt-tray vehicle, the system comprising:

a drawbar assembly adapted to be releasably attached to opposite corner connectors provided on the container such that the drawbar assembly extends transversely of the container adjacent a lower edge of the container and forwardly of the container;

means for applying traction to the drawbar assembly to draw the container onto the vehicle tray and to facilitate loading of the container onto the tray wherein, in use, when the vehicle tray is inclined and positioned with the back of the tray adjacent the drawbar assembly, the drawbar assembly cooperates with the inclined tray to lift the lower edge of the container onto the tray; and, an ejector assembly adapted to releasably engage the drawbar assembly when the container has been loaded onto the tray wherein, in use, when it is desired to unload the container the ejector assembly is moved towards the rear of the tray to move the container partially off the tray to facilitate unloading of the container off the vehicle.

Preferably the ejector assembly is provided in connection with the vehicle tray and is movable between a fully retracted and fully extended position on the tray. Advantageously the ejector assembly comprises an ejector head which is movable between a raised position in which it extends upwards from an upper surface of the vehicle tray and a lowered position in which it is concealed below the upper surface of the vehicle tray whereby, in use, in the raised position the ejector head can engage with the drawbar assembly whereas in the lowered position it disengages from the drawbar assembly. Preferably the ejector assembly further comprises an hydraulic cylinder for moving the ejector assembly between the fully retracted and fully extended positions. Typically the means for applying traction comprises a winch provided on the vehicle tray and a winch cable which can be attached to the drawbar assembly. Typically the invention may provide for a system and method of loading and unloading a shipping container, wherein the container is a 40 foot container.

According to a further aspect of the present invention there is provided an ejector assembly for moving a container partially off a tilt-tray vehicle, the ejector assembly being movable between a fully retracted and fully extended position on the tray, the ejector assembly comprising an ejector head which is adapted to releasably engage a drawbar assembly attached to the container whereby, in use, the ejector assembly can move the container partially off the vehicle to facilitate unloading of the container off the vehicle tray in a controlled manner.

Preferably the ejector assembly is provided in connection with the vehicle tray. Advantageously the ejector head is movable between a raised position, in which it extends upwards from an upper surface of the vehicle tray, and a lowered position in which it is concealed below the upper surface of the vehicle tray. Preferably the ejector head is L-shaped and is pivotally mounted so as to be movable between the raised position and the lowered position. Preferably in the raised position the ejector head can engage with the drawbar assembly whereas in the lowered position it disengages from the drawbar assembly. The ejector assembly typically further comprises an hydraulic cylinder for moving the ejector assembly between the fully retracted and fully extended positions.

Throughout the specification, unless the context requires otherwise, the word "comprise" or variations such as "comprises" or "comprising", will be understood to imply the inclusion of a stated integer or group of integers but not the exclusion of any other integer or group of integers. Likewise the word "preferably" or variations such as "preferred", will be understood to imply that a stated integer or group of integers is desirable but not essential to the working of the invention.

BRIEF DESCRIPTION OF THE DRAWINGS

The nature of the invention will be better understood from the following detailed description of a specific embodiment of the system and method of loading and unloading shipping containers, given by way of example only, with reference to the accompanying drawings, in which:

FIGS. 7 (a) and (b) are a side elevation and a section view respectively of the ejector assembly of FIG. 6 showing the ejector assembly in a fully extended position;

DETAILED DESCRIPTION OF PREFERRED EMBODIMENTS

A preferred embodiment of the system of loading and unloading a shipping container onto and off a tilt-tray vehicle in accordance with the invention, as illustrated in FIGS. 1-13, comprises a drawbar assembly 10. The drawbar assembly 10 is adapted to be releasably attached to opposite corner connectors 12 provided on a shipping container 14 such that the drawbar assembly 10 extends transversely of the container 14 adjacent a lower edge of the container and forwardly of the container (see FIG. 5). The drawbar assembly 10 is similar to the draw bar assembly described in commonly-owned Australian Patent No 2006900175, the contents of which are incorporated herein by reference.

The drawbar assembly 10 comprises an elongated hollow beam 16 of rectangular cross-section which is typically fabricated of bisalloy, but may be made of any suitably strong and rigid material. The hollow beam 16 is preferably formed with a plurality of holes 17 at spaced intervals along its length, the holes 17 passing through both upper and lower walls of the beam 16. The holes 17 reduce the overall weight of the beam 16 without compromising its mechanical integrity. A slot 19 is provided centrally of the hollow beam 16, the slot passing through both upper and lower walls of the beam. The slot 19 is provided to enable the drawbar assembly 10 to cooperate with an ejector assembly 60, as will be described below.

The respective ends of the beam 16 are bevelled such that the beam has a shorter length at its front face 18 relative to its rear face 20. The bevelled ends of the beam 16 are provided with guide members in the form of end plates 22 secured to the respective ends of the beam 16 by welding. The end plates 22 thus converge towards each other. The guide members further comprise flanges 24 which extend from the end plates 22, the flanges 24 extending forwardly of the front face 18 of the beam 16 and also converging towards each other at a greater extent than the convergence of the end plates 22. Skid members 26 are also provided at the respective ends of the beam 16 but welded to the underside of the beam at right angles to the guide members. The skid members 26 also have forwardly extending flanges 28, which are angled upwards to facilitate sliding movement of the drawbar assembly 10 in a forwards direction.

Figures 4, 5:
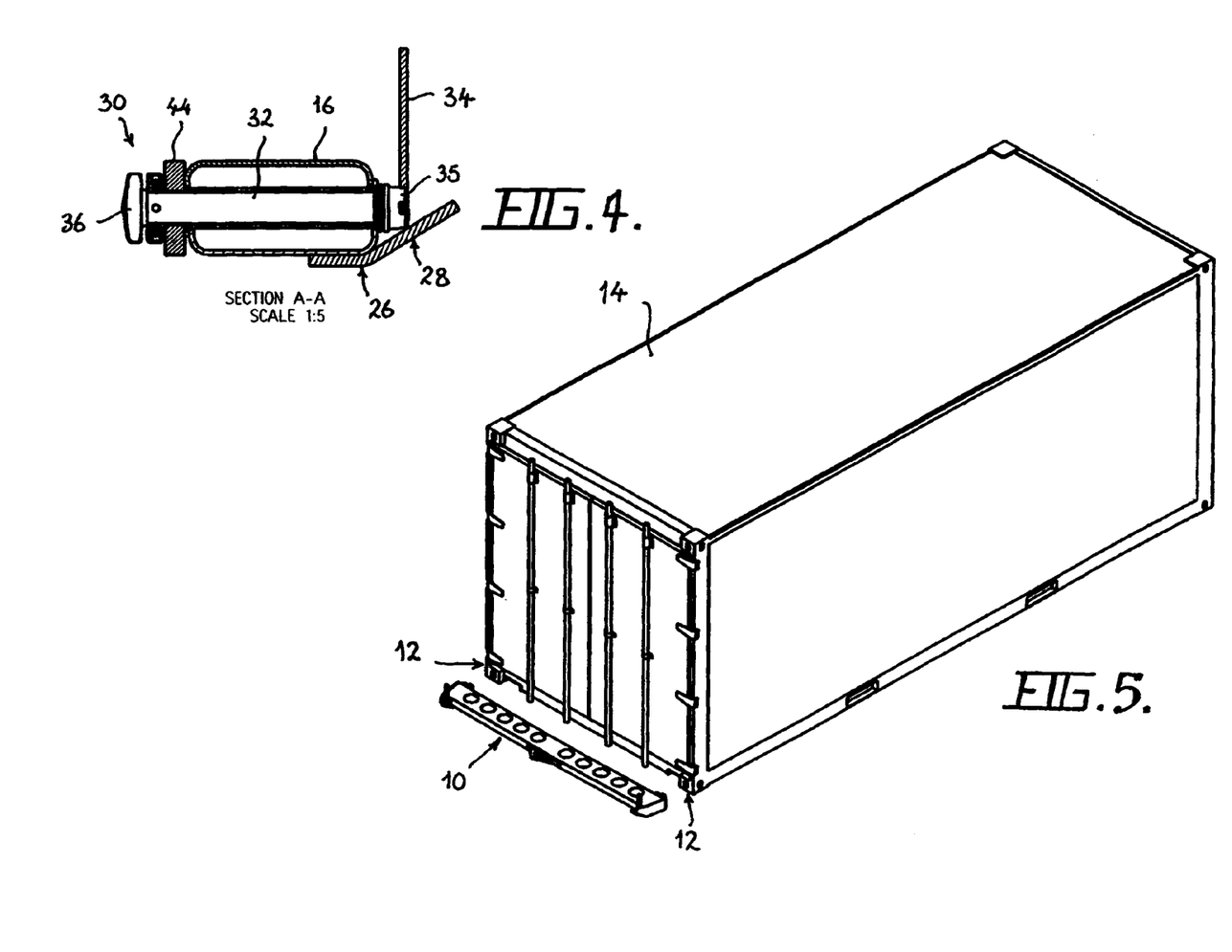
FIG. 4 is a cross-section view through the line A-A in FIG. 2 illustrating a locking mechanism of the drawbar assembly of FIG. 1.
FIG. 5 illustrates the method of releasably attaching the drawbar assembly of FIG. 1 to a shipping container.

Container attachment devices 30 are provided at the respective ends of the beam 16, each attachment device 30 including a locking bar 32, as can be seen most clearly in FIG. 4. The locking bar 32 is in the form of a cylindrical rod rotatably received in a bearing-like manner within the hollow beam 16 and extending between the front and rear faces of the beam 16. A radially extending handle 34 is fixed to one end of the locking bar 32 at the front face 18 of the beam by respective castellated retaining nuts 35. The opposite end of the locking bar 32 is provided with a cam-like off-centre engagement lug 36 fixed for rotation with the locking bar 32. The engagement lugs 36 are adapted to be received in the respective corner connectors 12 of the shipping container 14. Handles 34 can be pivoted through 90° to rotate the locking bars 32 so that the engagement lugs 36 move between an engaged and disengaged position.

Figure 1:
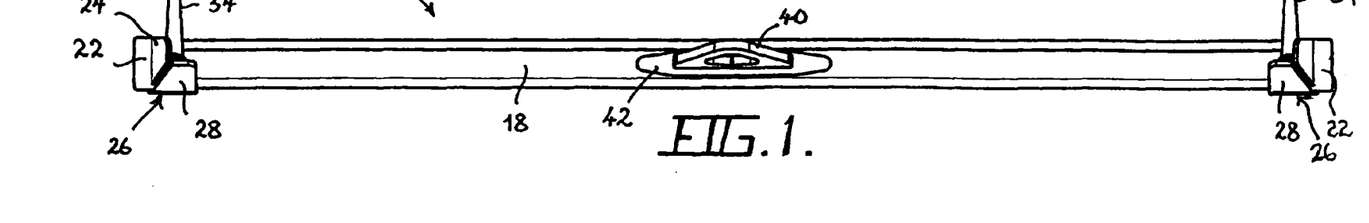
FIG. 1 is a front elevation of a preferred embodiment of a drawbar assembly according to the present invention.
Figure 2:
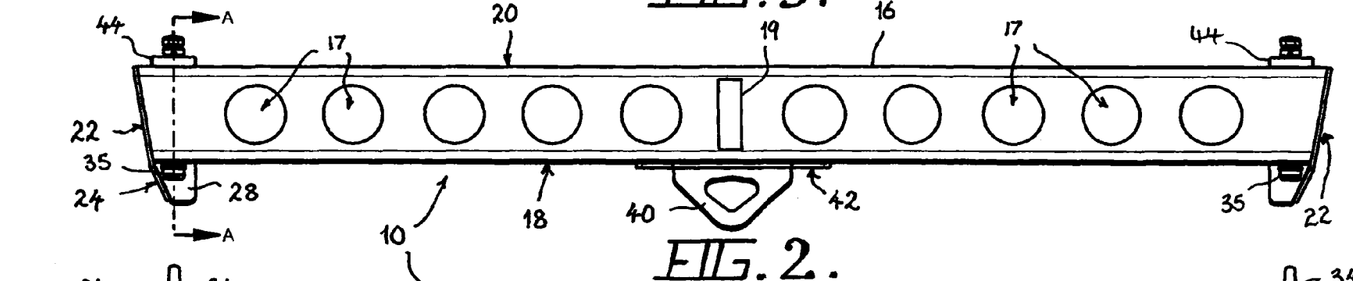
FIG. 2 is a plan view of the drawbar assembly of FIG. 1.
Figure 3:
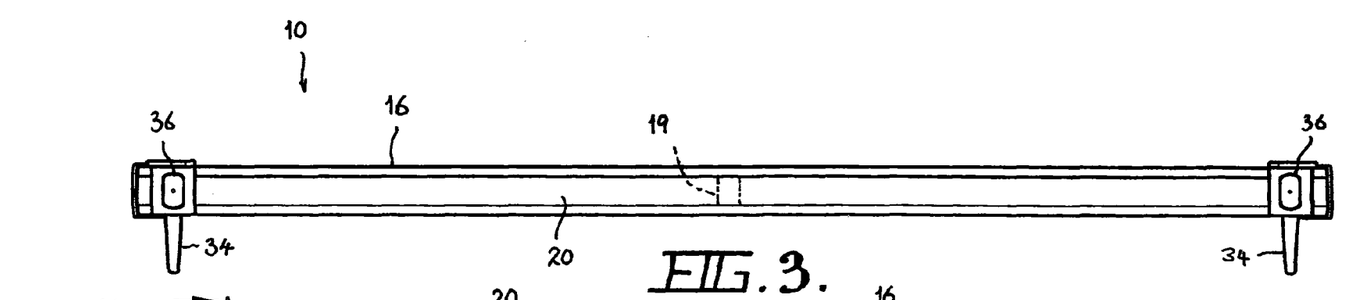
FIG. 3 is a rear elevation of the drawbar assembly of FIG. 1.

A draw plate 40, as shown in FIGS. 1 and 2, is fixed at a central position to the front face 18 of the beam 16 by welding through a stiffening plate 42. Spacer blocks 44 are provided at each end of the beam 16 on the rear face 20, to enable the drawbar assembly 10 to be connected to the container. Sometimes there are protruding parts along the front and/or rear edge of a container; spacer blocks 44 are designed to allow the rear face 20 of the beam 16 to sit in front of such protruding parts. The spacer blocks 44 are welded to the rear face 20 of the beam 16 in the region of the locking bar 32 of the container attachment devices 30.

The drawbar assembly 10 is designed for use with a vehicle 50 of the type having a flat-bed tray 52 mounted for tilting and/or tilt-slide movement relative to a chassis of the vehicle 50. The tray 52 is provided with means for applying traction to the drawbar assembly 10 in the form of a winch 54 arranged centrally of and at a front end of the tray, as shown in FIGS. 9 to 23. The winch 54 has a cable 56 which can be coupled to the draw plate 40 of the drawbar assembly 10 to draw the container 14 onto the vehicle tray 52 and to facilitate loading of the container 14 onto the tray 52. A rear edge of the tray 52 is preferably provided with a small ramp 58 to assist in guiding a container 14 onto the tray (see FIGS. 14 and 15). In use, when the vehicle tray 52 is inclined and positioned with the rear edge of the tray adjacent the drawbar assembly 10, the drawbar assembly cooperates with the inclined tray 52 to lift the lower edge of the container 14 onto the tray. This will be described in more detail below.

Figures 6, 7:
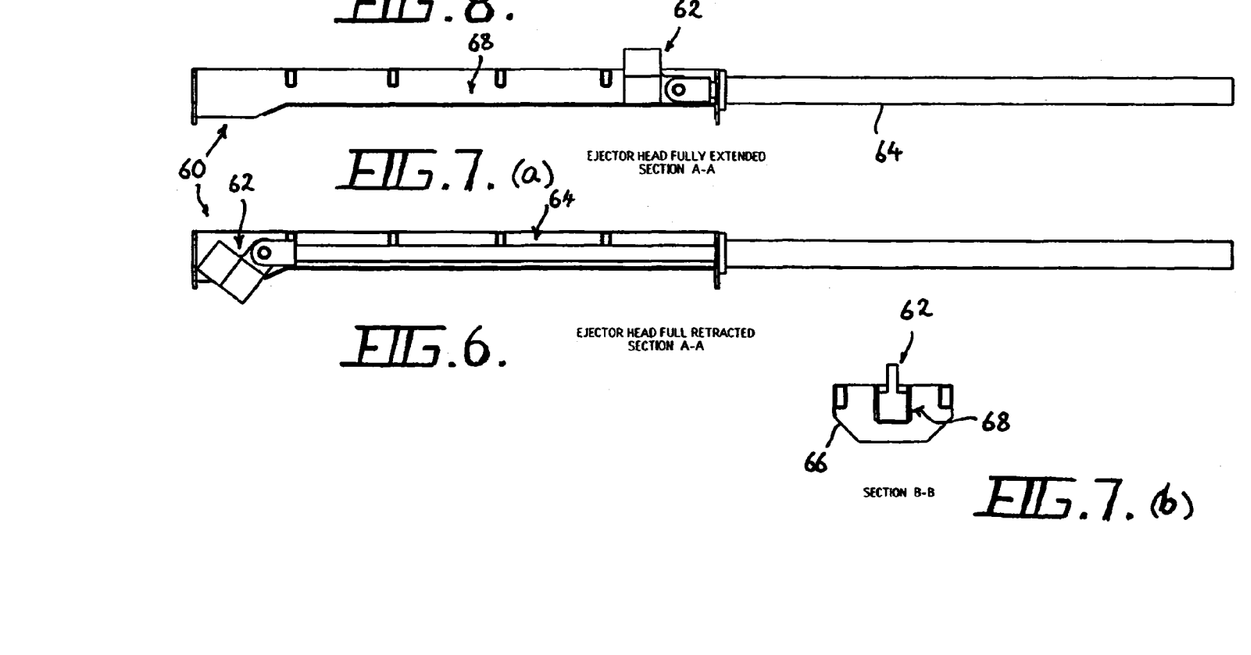
FIG. 6 is a side elevation partial section view of a preferred embodiment of an ejector assembly according to the present invention showing the ejector assembly in a fully retracted position.
Figure 8:
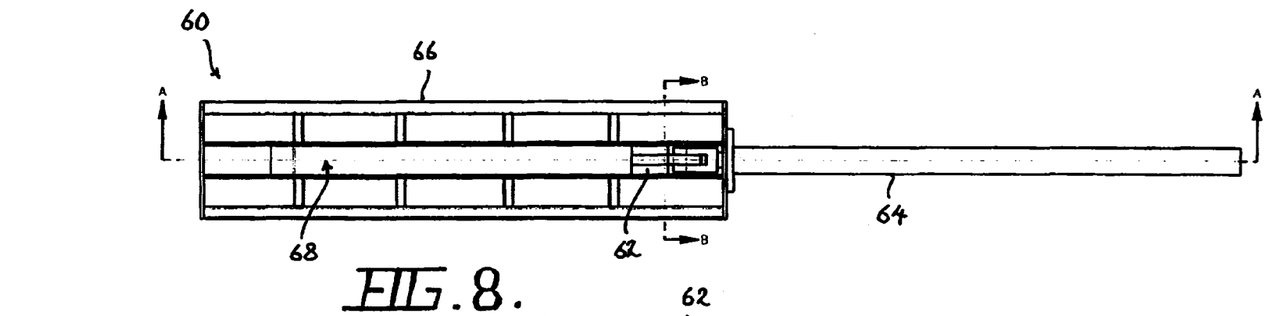
FIG. 8 is a plan view of the ejector assembly of FIG. 7 showing the ejector assembly in a fully extended position.

The system of loading and unloading a shipping container further comprises an ejector assembly 60 adapted to releasably engage the drawbar assembly 10 when the container 14 has been loaded onto the tray 52. In the illustrated embodiment the ejector assembly 60 is provided in connection with the vehicle tray 52, as can be seen most clearly in FIGS. 9 to 23. As illustrated in FIGS. 6 to 8, the ejector assembly 60 is movable between a fully retracted and fully extended position on the tray 52. Advantageously the ejector assembly 60 comprises an ejector head 62 which is movable between a raised position, in which it extends upwards from an upper surface of the vehicle tray 52 as shown in FIG. 7, and a lowered position in which it is concealed below the upper surface of the vehicle tray 52 as shown in FIG. 6. In use, in the raised position the ejector head 62 can engage with the drawbar assembly 10 whereas in the lowered position it disengages from the drawbar assembly 10. Preferably the ejector head 62 engages with the slot 19 provided for this purpose in the beam 16 of the drawbar assembly 10. The ejector assembly 60 further comprises an hydraulic cylinder 64 for moving the ejector assembly 60 between the fully retracted and fully extended positions.

As can be seen most clearly in FIGS. 6 to 8, the ejector assembly 60 is mounted longitudinally within the floor of the flat-bed tray 52 within a rectangular housing 66. The rectangular housing 66 is welded to the frame of the flat-bed tray 52 and forms an integral part of the tray 52. An elongate guide channel 68 extends the full length of the housing 66 and guides the ejector head 62 while it is moving between the fully retracted and fully extended positions. The hydraulic cylinder 64 is fixed to and extends from the rear end of the rectangular housing 66 towards the rear of the tray 52. The ejector head 62 is L-shaped and is preferably pivotally attached to the free end of the piston rod of the hydraulic cylinder 62. A remotely controlled activator (not visible) is provided to pivot the ejector head 62 from the lowered to the raised position, and vice versa. As will be described in more detail below, in use, when it is desired to unload the container 14 the ejector assembly 60 is moved towards the rear of the tray 52 to slide the container 14 in a controlled manner partially off the tray 52 to facilitate unloading of the container off the vehicle.

Figure 14:
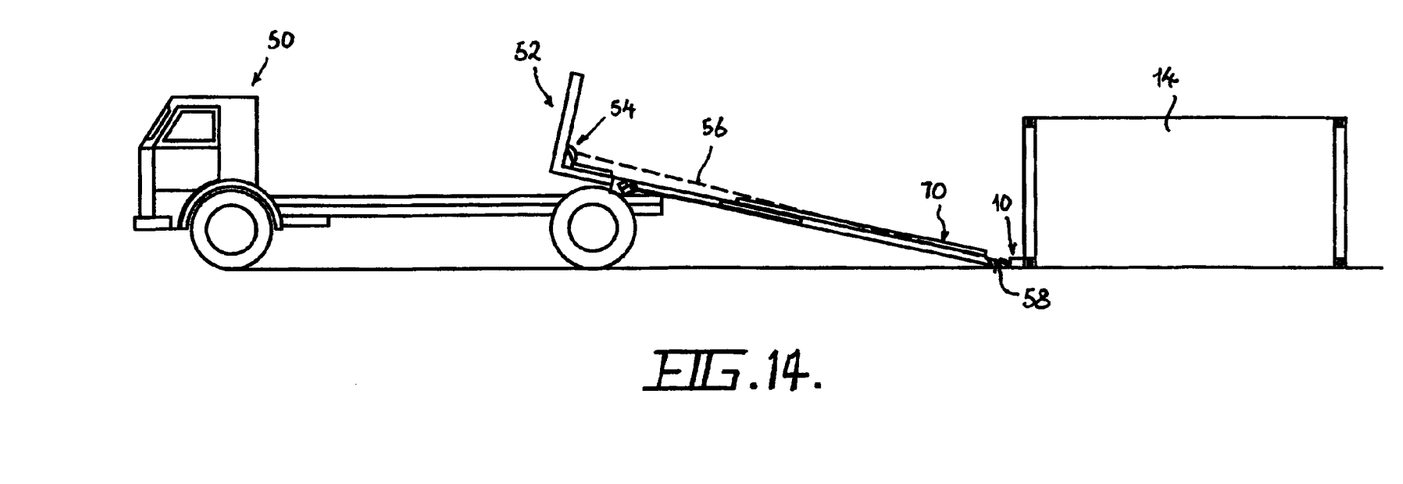

The vehicle tray 52 is preferably also provided with longitudinally extending upstanding guides 70 along the respective side edges of the tray 52 (see FIG. 14). The guides 70 are adapted to cooperate with the end plates 22 and flanges 24 of the guide members, together with the skid members 26 and their forwardly extending flanges 28 on the respective ends of the drawbar assembly 10, to guide the container 14 as it is drawn onto the tray 52.

A preferred method of loading and unloading a shipping container onto and off a tilt-tray vehicle in accordance with the invention will now be described with reference to FIGS. 9 to 23.

To load a container 14 onto the tray 52 using the drawbar assembly 10, the vehicle 50 is first operated to incline the vehicle tray 52 and position the rear edge of the tray 52 adjacent the drawbar assembly 10 on the lower edge of the container 14, as shown in FIG. 14. The drawbar assembly 10 is then manually slid from its secured position near the winch 54 down the vehicle tray 52 close to the container 14. A tool (not illustrated) may be used to perform this manual operation. The tool is approximately 1 m long with a handle at one end and a hook at the other. The operator simply hooks the drawbar assembly 10 with the tool and draws it down the tray 52. By using a tool of this nature the operator's posture is maintained in an upright position during this manual operation. The draw bar assembly 10 is then releasably attached to opposite corner connectors 12 provided on the container 14 using the container attachment devices 30. The hollow beam 16 of the drawbar assembly 10 thus extends transversely of the container 14 with the draw plate 40 extending in a forwards direction.

If not already connected, the drawbar assembly 10 then has its draw plate 40 connected via a coupling such as a shackle to the winch cable 56. The transmission of the vehicle 50 is put in neutral and the brake released. Traction is then applied to the drawbar assembly 10 by operating the winch 54 to apply tension to the cable 56 and to draw the container 14 onto the vehicle tray 52.

Figure 15:
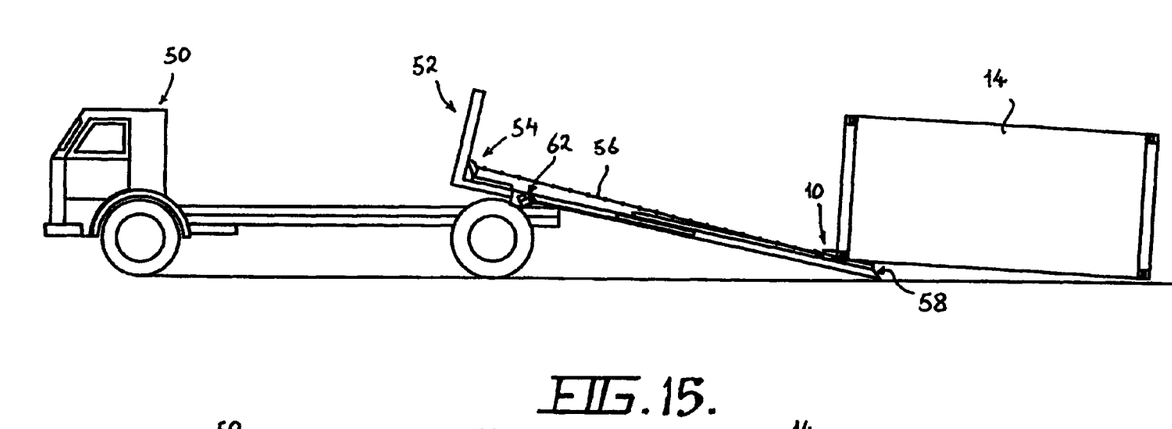

Since the drawbar assembly 10 is at the lower edge of the container 14 it will firstly engage the ramp 58, and as it is pulled up the ramp 58 it will elevate the front edge of the container 14 as shown in FIG. 15. This provides a smooth transition of the front edge of the container 14 onto the tray 52. At the same time, the respective flanges 24 and 28 on the ends of the drawbar assembly will engage and cooperate with the guides 70 along the respective sides on the upper surface of the tray 52. Any misalignment of the container 14 relative to the tray 52 during loading will be corrected by the cooperation between the guides 70 and the angled end plates 22 and their flanges 24 and the skid members 26 and their flanges 28 which serve to centralise the drawbar assembly 10 and the container 14 relative to the tray 52. Thus, even if the vehicle 50 and the container 14 are not quite aligned, the cooperation between the guides 70 and the angled end plates 22 and their flanges 24 and the skid members 26 and their flanges 28 perform a self-centring function. The driver of the vehicle simply turns the vehicle steer wheels, via the steering wheel, as the vehicle 50 is drawn backwards to align it with the container 14.

Figure 9:
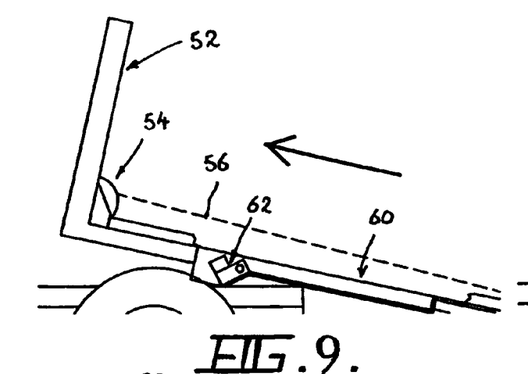
FIGS. 9 to 10 illustrate the method of loading a shipping container onto a tray of a vehicle using the ejector assembly of FIG. 6.
Figure 10:
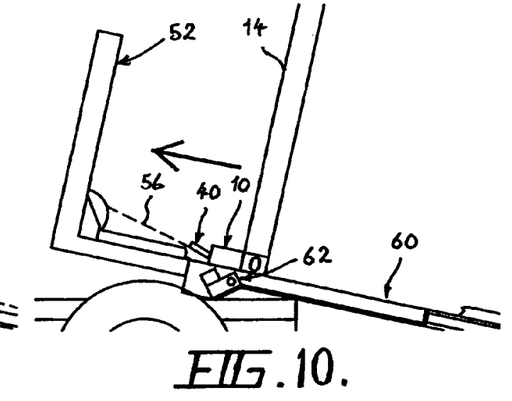
Figure 16:
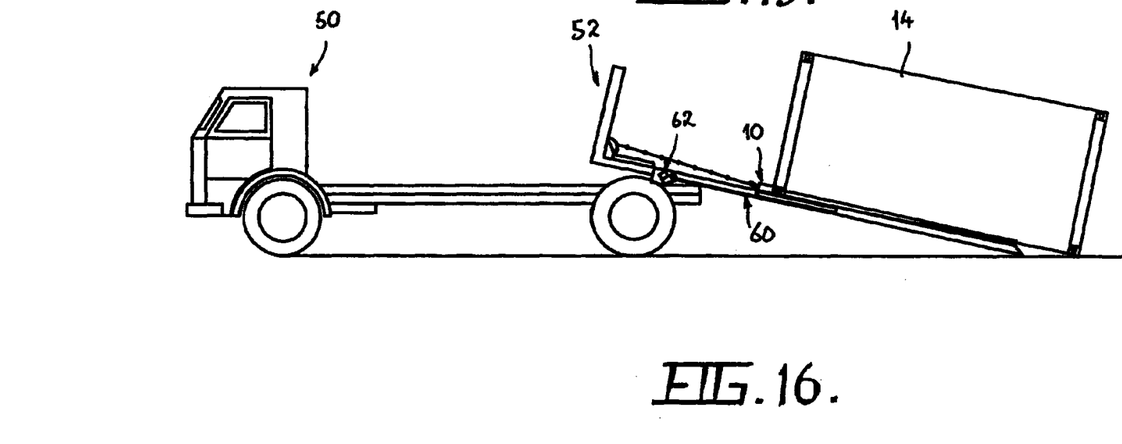
Figure 17:
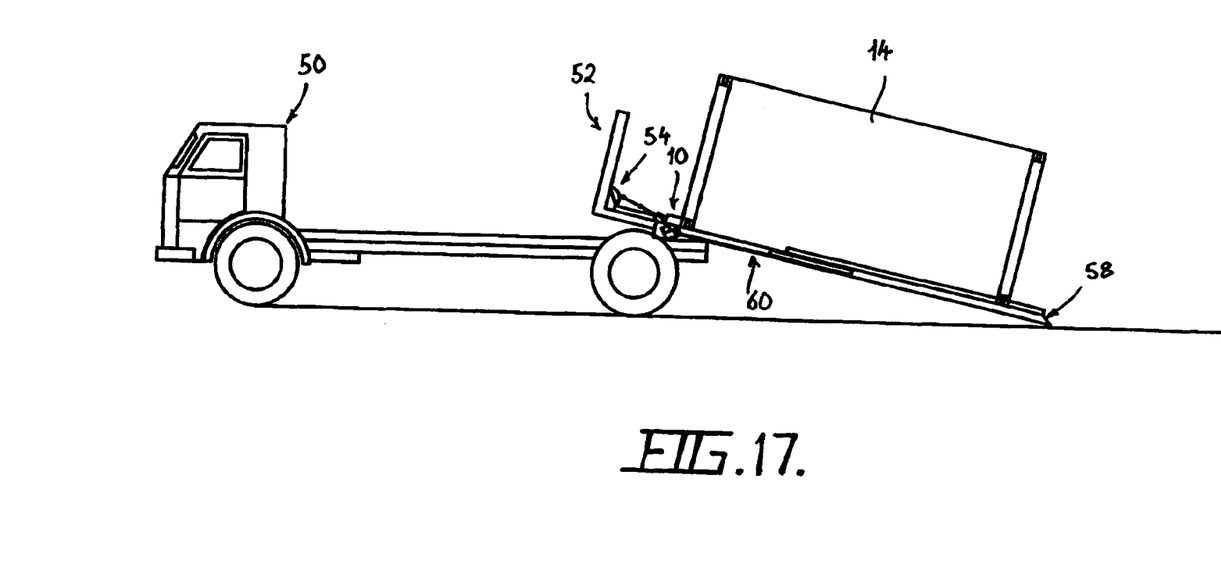
Figure 18:
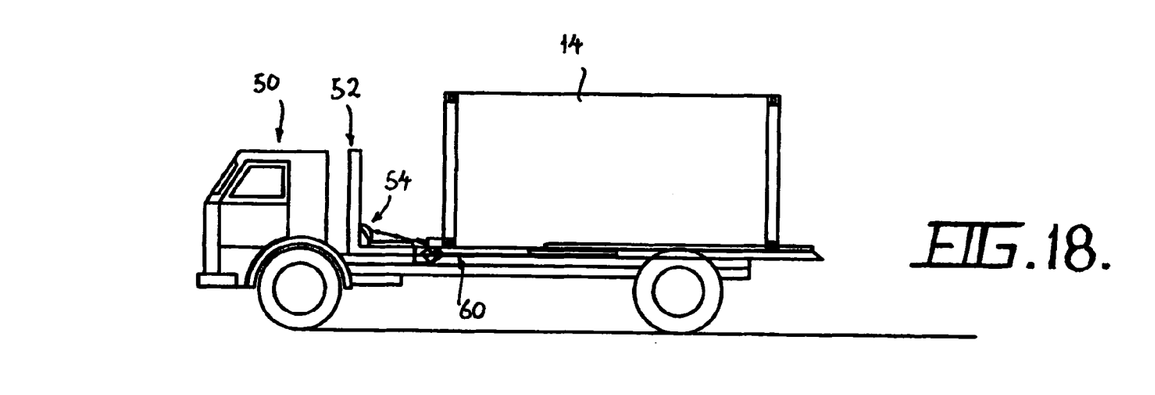

Continued operation of the winch 54 will cause the drawbar assembly 10 and the attached container 14 to be drawn further onto the tray 52 as shown in FIG. 16 (see also FIG. 9). Throughout this operation, the rear end of the container 14 remains stationary on the ground, whilst the vehicle 50 and tray 52 is drawn under the container. When the container 14 has been drawn wholly onto the tray 52, the winch 54 continues to operate until the container reaches the position shown in FIG. 17 (see also FIG. 10). In this position the container corner connectors 12 are typically aligned with corresponding fittings on the tray 52 so that the container can be secured to the tray. The tray 52 can then be pivoted back to its horizontal position as shown in FIG. 18. The container 14 is locked onto the tray 52 via the corner connectors and is then fully loaded on the vehicle 50. The drawbar assembly 10 can then be detached from the container 14 and stowed in the vehicle 50, or it can be left attached to the container 14 during transport.

Figure 11:
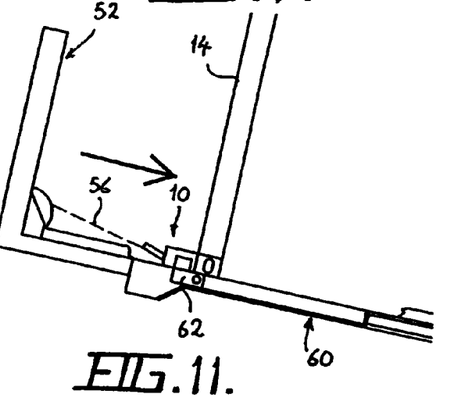
FIGS. 11 to 13 illustrate the method of unloading a shipping container from a tray of a vehicle using the ejector assembly of FIG. 6; and, FIGS. 14 to 23 illustrate each of the steps in a preferred embodiment of the method of loading and unloading a shipping container from the tray of a vehicle according to the present invention.
Figure 12:
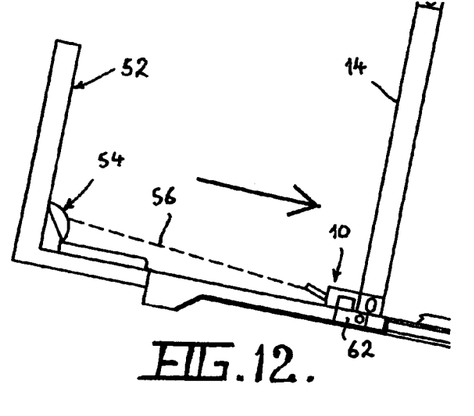
Figure 13:
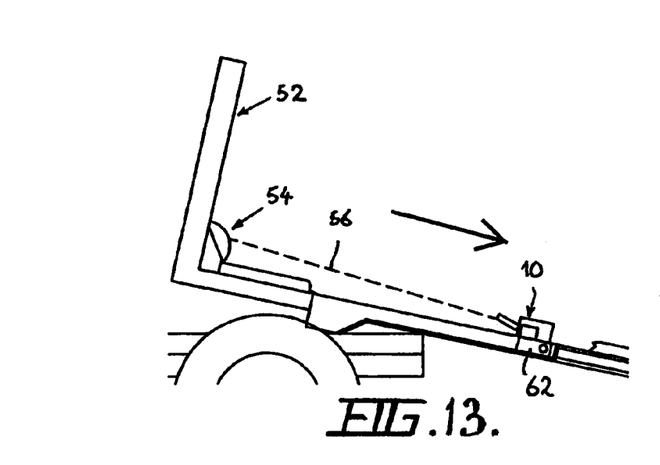
Figure 19:
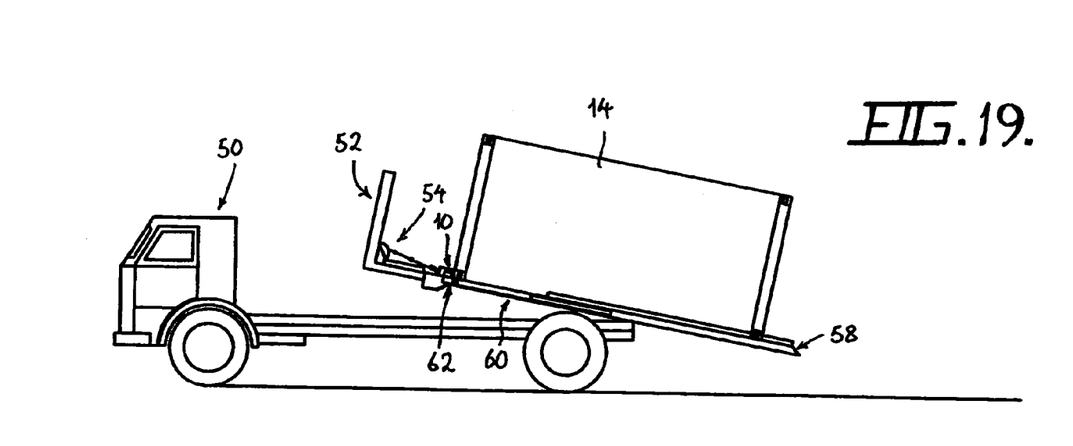
Figure 20:
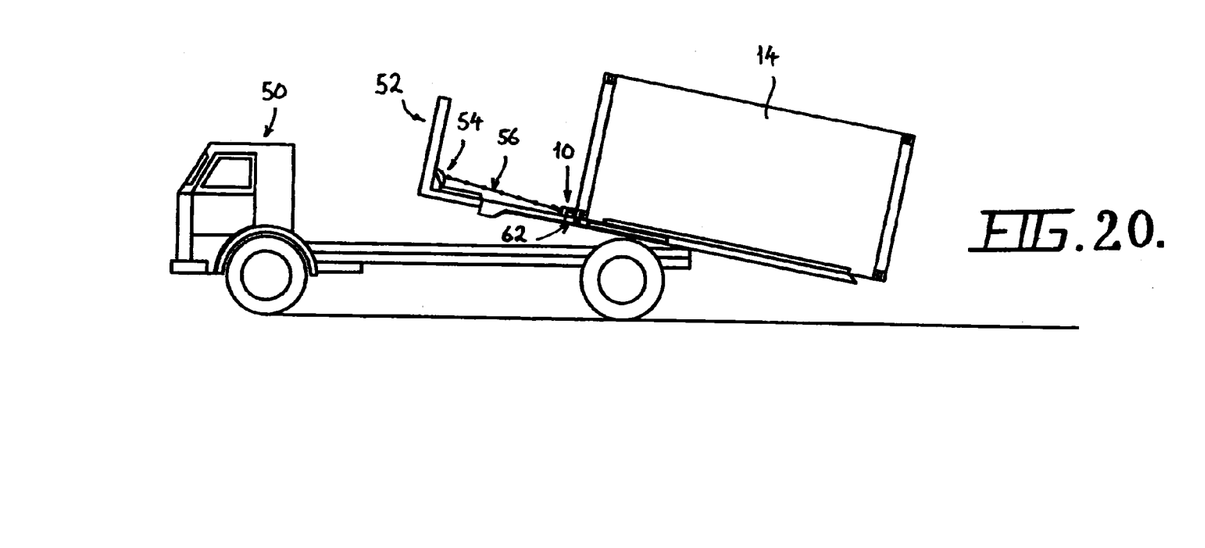

In order to unload the container 14, the drawbar assembly is first reattached to the respective corner connectors 12 provided on the front lower edge of the container 14, (see FIG. 5). All four bottom corner connectors 12 on the container 14 are released from the flat-bed tray 52. The drawbar assembly 10 may then be releasably engaged by the ejector assembly 60. The ejector head 62 is pivoted to the raised position so that it engages with the slot 19 in the drawbar assembly 10 as shown in FIGS. 11 and 19. At the same time, or subsequently, the tray 52 is titled to an inclined position. When it is desired to unload the container 14, the ejector assembly 60 is moved towards the rear of the tray 52. Hydraulic cylinder 64 is operated to begin moving the ejector head 62, with the drawbar assembly 10 and container 14 attached, towards the rear of the tray 52, as shown in FIGS. 12, 13 and 20, to move the container 14 in a controlled manner partially off the vehicle to facilitate unloading of the container off the vehicle tray.

Figure 21:
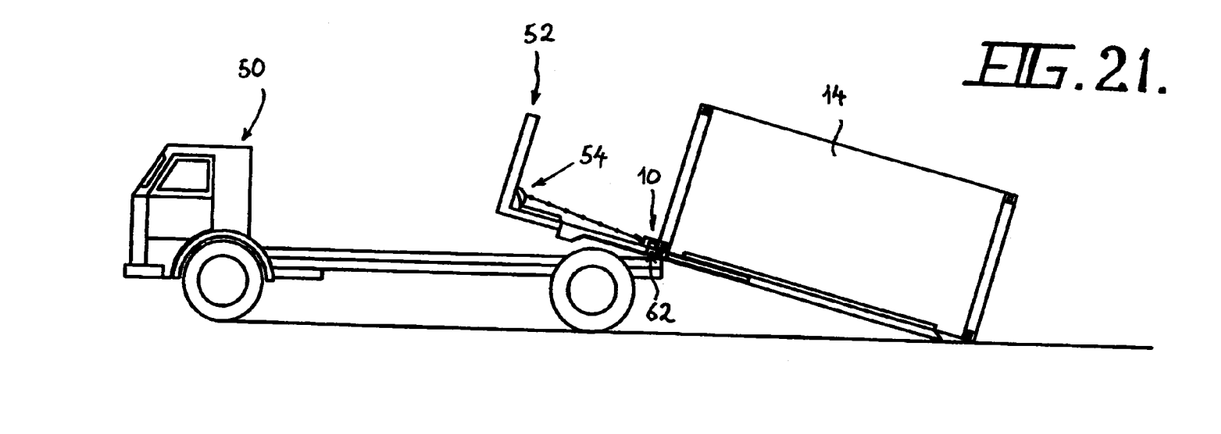

When the ejector assembly 60 has moved to its fully extended position the container 14 (attached to the drawbar assembly 10) hangs about 600 mm over the rear of the tray 52. The tilt-tray 52 is then lowered so that the rear lower edge of the container 14 makes purchase with a designated drop-off point, as shown in FIG. 21, cushioned by blocks (not illustrated) to protect the surface of the designated drop-off point.

Figure 22:
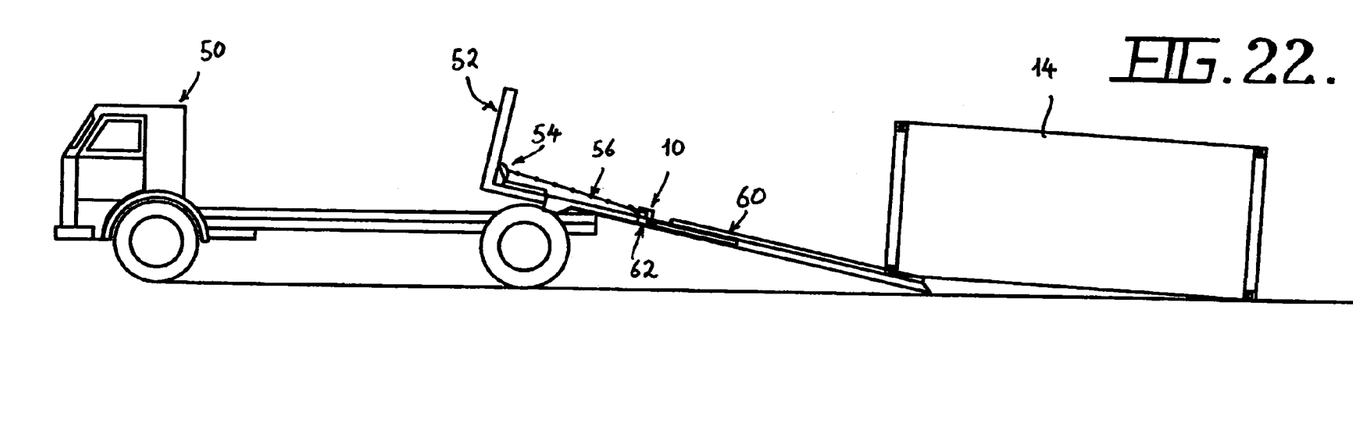
Figure 23:
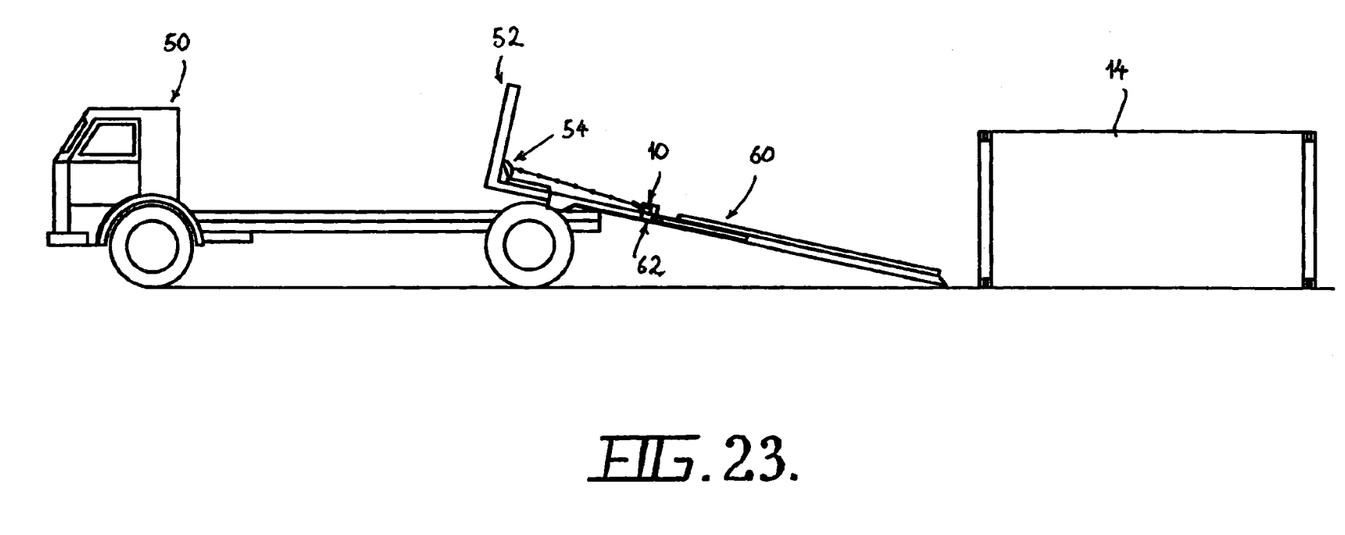

The drawbar assembly 10 is then released from the container 14 and, with the ejector assembly 60, returned to the rest position using the remote control. At the same time, or subsequently, the vehicle 50 is slowly driven forward so that the remainder of the container 14 slides off the tray 52 and comes to rest on the designated drop-off point, as shown in FIGS. 22 and 23. When drawbar assembly 10 has returned to its rest position, the ejector head 62 is disengaged from the drawbar assembly 10 and returned to its lowered position beneath the upper surface of the tilt-tray 52. The drawbar assembly 10 is then secured in a locked position on the tray 52.

The described system and method of loading and unloading containers can be employed with any ISO standard size shipping container, from 8 foot to 48 foot in length. Typically it is used with 20 foot containers. More typically it is used with 40 foot containers. It can also be used with two containers that are joined end-to-end.

Now that a preferred embodiment of the system and method of loading and unloading shipping containers has been described in detail, it will be apparent that the described embodiment provides a number of advantages over the prior art, including the following:
(i) The system and method enables a container to be quickly, safely and efficiently loaded and unloaded from a tilt-tray vehicle without the need for a crane or hoist.
(ii) The drawbar assembly and ejector assembly ensure the loading and unloading operation is as smooth and safe as possible without resulting in the container getting stuck at any point, and avoiding unacceptable delays and hazards.
(iii) The ejector assembly provides an effective means of unloading the container which cooperates with the drawbar assembly.

It will be readily apparent to persons skilled in the relevant arts that various modifications and improvements may be made to the foregoing embodiments, in addition to those already described, without departing from the basic inventive concepts of the present invention. For example, whilst the described ejector assembly is designed to operate with the drawbar assembly it will be apparent that with minor modifications it may also be used independently of the drawbar assembly to assist with unloading a container and other ejectable loads. Therefore, it will be appreciated that the scope of the invention is not limited to the specific embodiments described.

The invention claimed is:

1. A method of loading and unloading a shipping container onto and off a tilt-tray vehicle, the method comprising:
releasably attaching a drawbar assembly to opposite corner connectors provided on the container such that the drawbar assembly extends transversely of the container adjacent a lower edge of the container and forwardly of the container;
inclining the vehicle tray and positioning a rear edge of the tray adjacent the drawbar assembly on the lower edge of the container;
applying traction to the drawbar assembly to draw the container onto the vehicle tray and to facilitate loading of the container onto the tray wherein, in use, the drawbar assembly cooperates with the inclined tray to lift the lower edge of the container onto the tray;
when it is desired to unload the container:
releasably engaging the drawbar assembly attached to the container on the tray with an ejector assembly, moving the ejector assembly towards the rear of the tray to move the container partially off the vehicle to facilitate unloading of the container off the vehicle tray, inclining the vehicle tray and moving the tray until a rear edge of the container rests on the ground at a designated drop-off point, releasing the drawbar assembly from the container and, with the ejector assembly, returning the drawbar assembly to a rest position, at the same time as, or subsequent to, the step of returning the drawbar assembly to the rest position, driving the vehicle slowly forward so that the remainder of the container slides off the tray and comes to rest on the designated drop-off point; and, when the drawbar assembly has returned to its rest position, the ejector head is disengaged from the drawbar assembly and returned to its lowered position beneath the upper surface of the tilt-tray, and the drawbar assembly is secured in a locked position on the tray.

2. A method of loading and unloading a shipping container as defined in claim 1, wherein when the ejector assembly has moved to its fully extended position the container, attached to the drawbar assembly, hangs about 600 mm over the rear of the tray.

3. A system of loading and unloading a shipping container onto and off a tilt-tray vehicle, the system comprising:

a drawbar assembly adapted to be releasably attached to opposite corner connectors provided on the container such that the drawbar extends transversely of the container adjacent a lower edge of the container and forwardly of the container;

means for applying traction to the drawbar assembly to draw the container onto the vehicle tray and to facilitate loading of the container onto the tray wherein, in use, when the vehicle tray is inclined and positioned with the back of the tray adjacent the drawbar assembly, the drawbar assembly cooperates with the inclined tray to lift the lower edge of the container onto the tray;

an ejector assembly adapted to releasably engage the drawbar assembly when the container has been loaded onto the tray, the ejector assembly being provided in connection with the vehicle tray and being movable between a fully retracted and fully extended position on the tray wherein, in use, when it is desired to unload the container the ejector assembly is moved towards the rear of the tray to move the container partially off the vehicle to facilitate unloading of the container off the vehicle tray, and wherein the ejector assembly comprises an ejector head which is movable between a raised position in which it extends upwards from an upper surface of the vehicle tray and a lowered position in which it is concealed below the upper surface of the vehicle tray whereby, in use, in the raised position the ejector head can engage with the drawbar assembly whereas in the lowered position it disengages from the drawbar assembly.

4. A system of loading and unloading a shipping container as defined in claim 3, wherein the ejector assembly further comprises a hydraulic cylinder for moving the ejector assembly between the fully refracted and fully extended positions.

5. A system of loading and unloading a shipping container as defined in claim 3, wherein the means for applying traction comprises a winch provided on the vehicle tray and a winch cable which can be attached to the drawbar assembly.

6. A system of loading and unloading a shipping container as defined in claim 3, wherein the container is a 40 foot container.

\* \* \* \* \*